Jan. 8, 1929. 1,698,604
R. MOORE
FLOATING LEVER BRAKE ENGINE
Filed Oct. 7, 1920 4 Sheets-Sheet 1

Inventor:
Roscoe Moore
by his Attorneys:
Howson & Howson.

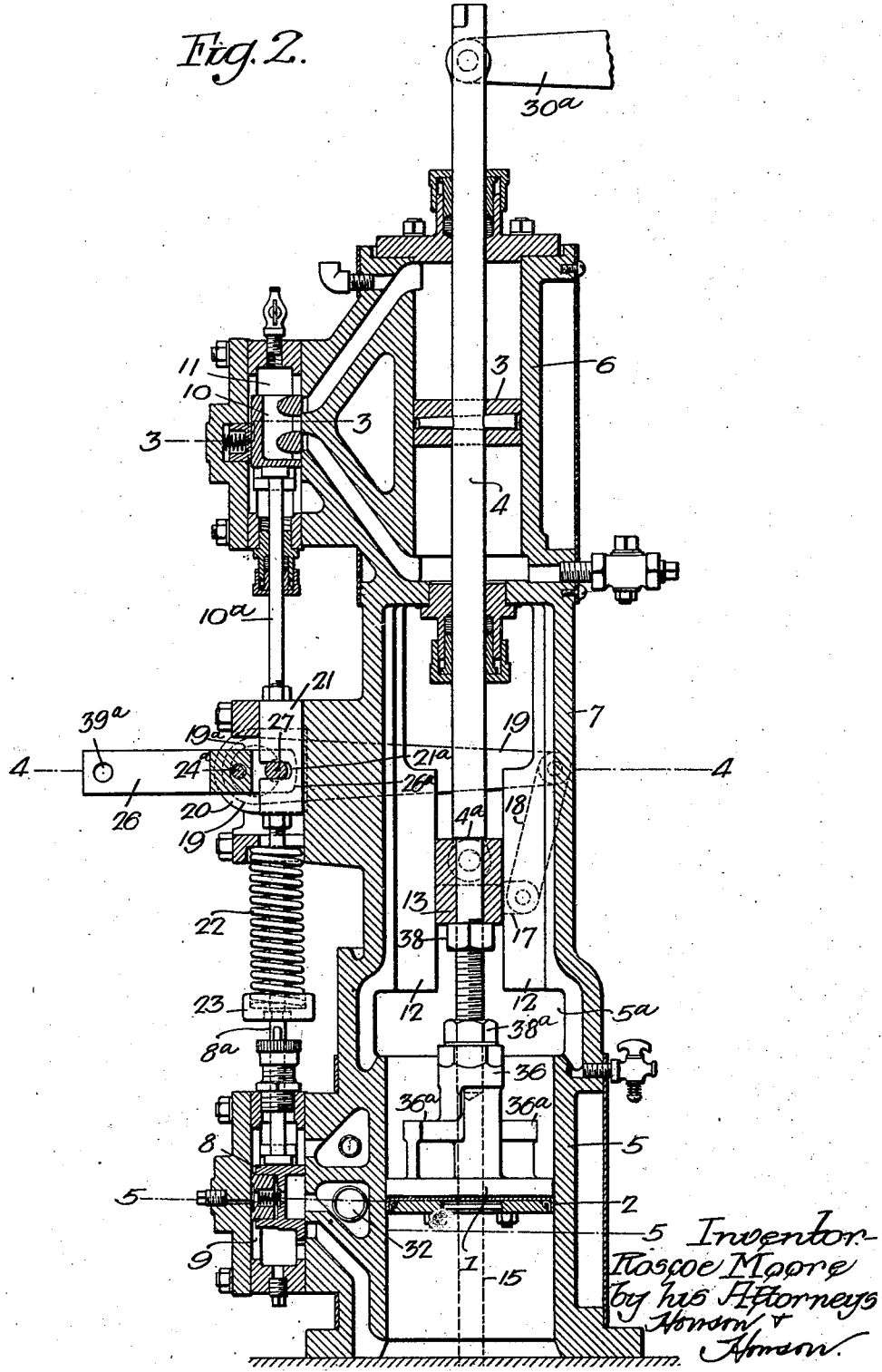

Jan. 8, 1929.　　　　　　　　　　　　　　　1,698,604
R. MOORE
FLOATING LEVER BRAKE ENGINE
Filed Oct. 7, 1920　　　　4 Sheets-Sheet 3
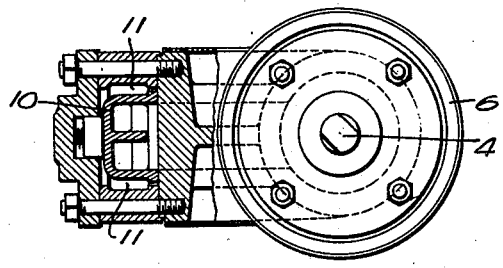
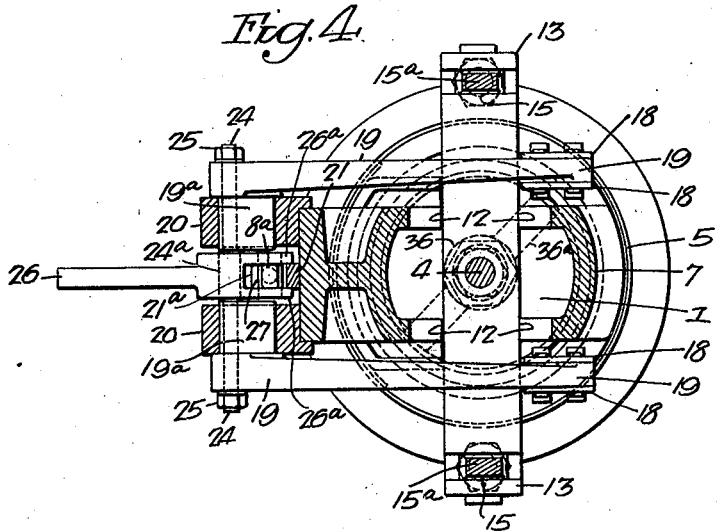
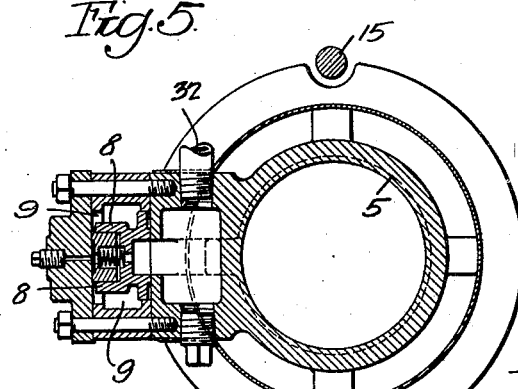
Inventor –
Roscoe Moore
by his Attorneys
Howson + Howson

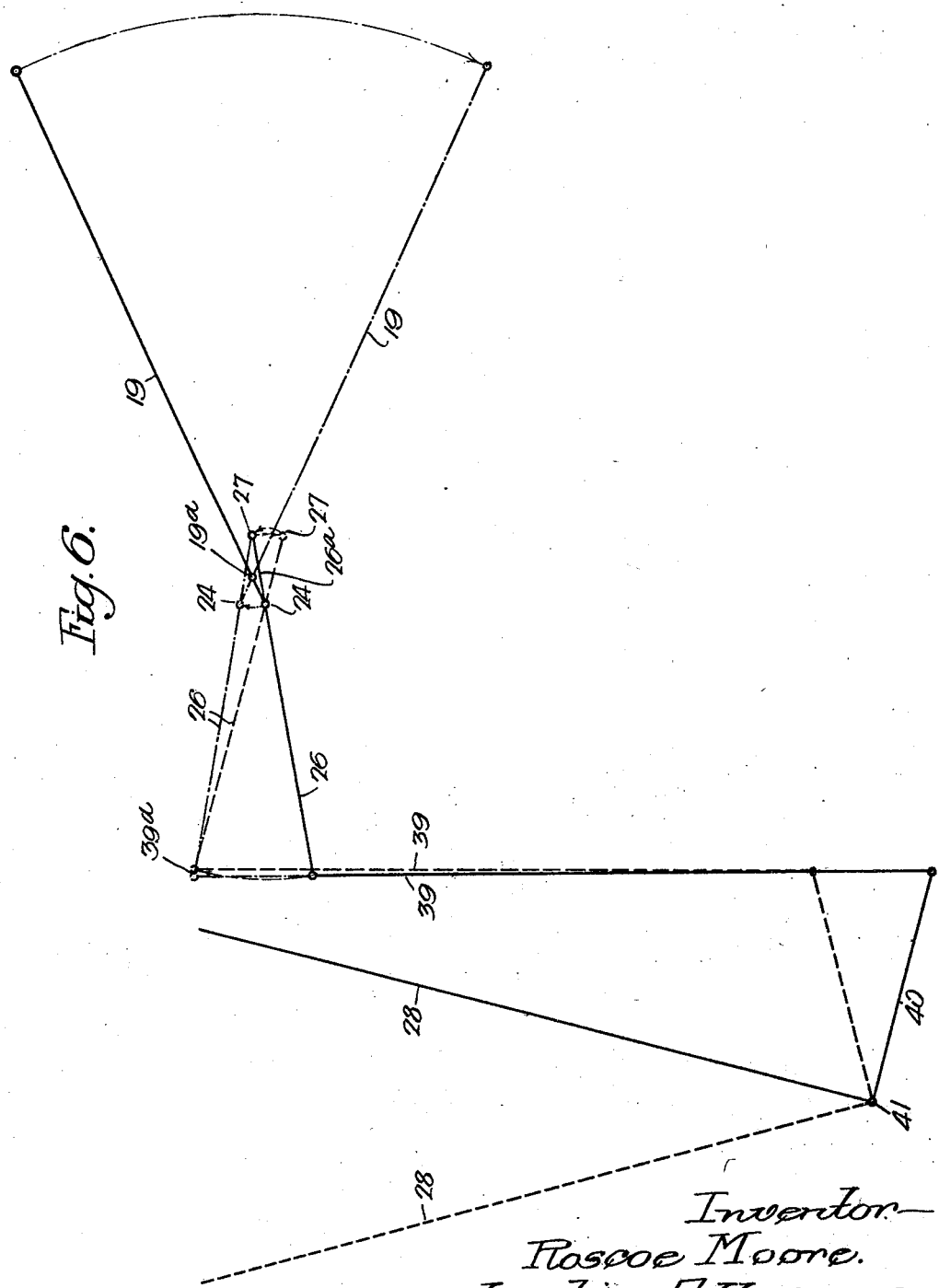

Patented Jan. 8, 1929.

1,698,604

UNITED STATES PATENT OFFICE.

ROSCOE MOORE, OF WILKES-BARRE, PENNSYLVANIA, ASSIGNOR TO VULCAN IRON WORKS, OF WILKES-BARRE, PENNSYLVANIA, A CORPORATION OF PENNSYLVANIA.

FLOATING-LEVER BRAKE ENGINE.

Application filed October 7, 1920. Serial No. 415,368.

My invention relates to power brake engines of the gravity type commonly employed in connection with mine hoists and the like, the main object of the invention being to provide means whereby an operator by manipulation of a master lever may secure movement of heavy brake weights coinciding accurately with the movement of the said lever, thereby giving the operator absolute control of the movement of the brake shoe.

A further object is to provide means in connection with suitable safety apparatus such as that forming the subject-matter of my former Patent No. 1,284,129, of November 5, 1918, for automatically applying the brake in the case of overtravel, overspeed and other abnormalities in the functioning of the hoist.

The mechanism whereby these and other objects appearing hereinafter are achieved will be more clearly understood by reference to the accompanying drawings, in which:

Fig. 2, is a vertical section of the engine;

Fig. 3, is a horizontal section taken on the line 3—3, Fig. 2;

Fig. 4, is a horizontal section taken on the line 4—4, Fig. 2;

Fig. 5, is a horizontal section taken on the line 5—5, Fig. 2, and

Fig. 6, is a diagrammatic view illustrating the movement of the floating lever and the operation of the engine.

Figure 1:
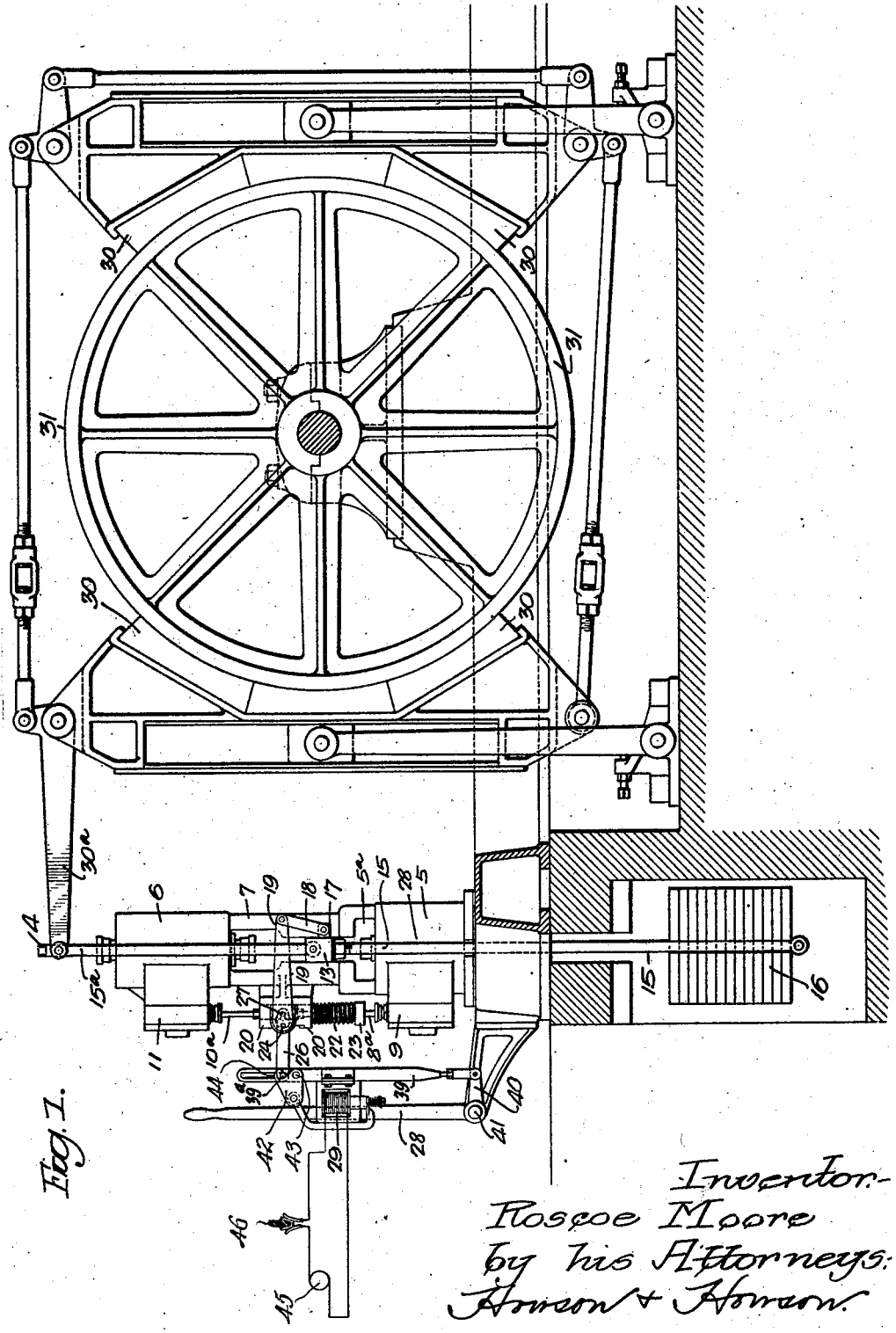
Figure 1, is a side elevation of an engine made in accordance with my invention.

I have shown in the drawings for the purpose of illustrating my invention an engine particularly adapted to operation by compressed air, this particular form of engine embodying numerous improvements in construction which will hereinafter be fully brought out. It will be understood, however, that the invention is not limited to engines of the exact form illustrated, but may find general application in brake engines of the gravity type.

The engine consists essentially of an actuating piston 1 provided preferably with non-leaking cup packing 2, a cataract or gag piston 3 and a common piston rod 4 joining the pistons, said pistons being established respectively within a main cylinder 5 and a cataract cylinder 6 formed at bottom and top respectively of the casing 7 of the engine. The piston rod 4 is shown in the present instance connected through a cross head 13 and a pair of links 15$^a$, 15$^a$, with a forked brake lever 30$^a$ operatively connected with brake shoes 30 adapted to operate upon a drum 31 of hoisting mechanism.

The introduction of the operating fluid, air in the present instance, to the main cylinder is controlled by a valve 8 established within a valve chamber 9 at one side of the cylinder, while the flow of the fluid in the cataract cylinder is controlled by a valve 10 established within a valve chamber 11 at the side of the said cataract cylinder, said valves 8 and 10 being joined by valve stems 8$^a$ and 10$^a$ and an intermediate valve stem block 21.

Attached to the piston rod 4 intermediate the pistons 1 and 3 is the cross head 13 adapted to travel in suitable guides 12 formed in the frame 7, to which cross head are suitably attached suspension rods 15, 15, for the weights 16. The cross head 13 also carries pin lugs 17, to which are secured links 18, 18, which impart the motion of the cross head to trunnion levers 19, said trunnion levers being rotatably mounted in fixed bearings 20 on the front of the engine. These bearings 20 also form and function as a guide for the valve stem block 21, and as a seat for a spring 22 carried by the valve stem 8$^a$, and confined between a collar or washer 23 fixed to the said stem, and the under side of the said bearing 20. A purpose of the said spring 22 is to eliminate all lost motion in the pins between the floating lever and the actuating piston 1, regardless of the looseness with which they may be fitted or which may develop by wear. The spring also provides means for quickly setting the valve 8 in the brake-applying position after release of the floating lever by the safety apparatus, as will hereinafter be more fully described. It will be apparent that a weight or air piston might be substituted for the spring with no departure from the invention.

The trunnion levers 19 are enlarged at the end adjacent the bearings, and passing in the present instance through the trunnions 19$^a$ eccentric to the axes thereof is a pin 24 having an enlarged body portion 24$^a$ located between the inner ends of the said trunnions. Suitable nuts 25 on the ends of the pin 24 permit the clamping of the trunnion levers against the ends of the enlarged body portion 24$^a$ of the pin. The pin 24 is located eccentrically with and beyond the center of the trunnions, but on a common center line of the levers, thus forming a second but very short lever.

Upon the enlarged portion of the pin 24 is pivotally mounted a floating lever 26, the inner or engine end 26ª of this lever being forked to straddle the valve stem slide block 21, and mounted in the said forked end 26ª is a pin 27 which is flattened intermediate its ends to engage a slot 21ª in the said slide block 21. The opposite or outer end of the floating lever 26 is adapted to be connected by means of suitable elements such as the link 39, a lever arm 40 and a shaft 41 to which the said arm is attached, to an operating lever 28, also attached to the said shaft, and with a safety apparatus 29, in a manner similar to that disclosed in my above mentioned U. S. Patent No. 1,284,129, which fully describes the said safety apparatus and the manner in which it is interconnected with the floating lever and the operating lever 28. As clearly illustrated, the link 39 is longitudinally slotted at the top for reception of the pin 39ª, and the pin is normally retained in the bottom of the slot by means of a retaining plate 42 pivotally secured at 43 to the said link 39 and having a hook portion 44 which passes over the top of the pin 39ª. The safety apparatus 29 consisting in the present instance of a solenoid energized from a suitable source of current 45 is also mounted on the link 39 and is operatively connected with the plate 42 in such manner that an interruption in the current supply resulting for example from the opening of a switch 46 causes the plate to be turned on its pivot so as to release the pin 39ª. In the present case, the arrangement is such that normally the said apparatus acts as a counterbalance for the spring 22 whereby the operating lever through the interconnecting links is held in a balanced position unaffected by the pressure of the spring 22. This counterbalancing effect is due to the fact that the action of the spring 22 is opposed by the entire weight of the apparatus 29 and of the link 39. When, however, the pin 39ª is released by the aforedescribed movement of the plate 42, the counterbalancing effect of the apparatus 29 is removed, since the pin 39ª is free to move upwardly in the slot in the link 39.

The operation of the device in so far as described is as follows:

In Fig. 2, the valves 8 and 10 are shown in the normal positions in which the pistons 1 and 3 are held motionless in their respective cylinders, and to which normal positions the said valves are automatically returned after each displacement by the action of the floating lever mechanism forming the subject of the present invention. This action of the floating lever mechanism will be more readily understood by reference to Fig. 6 of the drawings, which shows the said mechanism in diagrammatic form, the corresponding positions of the levers in the "brake-off" position being indicated by the solid lines.

We will now suppose that the operating lever is thrown from the "brake-off" position to the "brake-on" position indicated by the dash lines. This movement of the operating lever will cause the shifting of the floating lever to the position also illustrated by the broken lines. It will be seen that in this initial movement the floating lever moves around the pin 24 as a fulcrum, the inner end of the floating lever, to which are connected the valve stems, being thrown downwardly from the normal position described above whereby the valve 8 is shifted to a position permitting discharge of the actuating fluid within the cylinder 5 through the exhaust port 32, the piston 1 accordingly moving downward under the effect of the weight 16 and carrying with it in its downward motion the free end of the trunnion levers 19, which move around the fixed pivot formed by the said trunnions. As the trunnion levers turn around their fixed pivot, the pin 24 is carried upwardly together with the end of the floating lever to which the said pin is attached, the floating lever in this movement turning around the pin 39ª which connects the outer end of the said lever to the link 39, whereby the inner end of the said floating lever is carried upwardly together with the valve 8 until the further movement of the parts is prevented by application of the brake shoes 30 to the drum 31, or the said inner end of the lever and the valve 8 assume their original normal positions, as previously described. Supposing the latter to be the case, the final positions of the floating lever and of the trunnion levers are shown by dot and dash lines, the movement of the engine when these positions of the elements have been reached automatically stopping, since the exhaust port of the cylinder 5 and the ports of the cataract cylinder are closed and further movement of the piston 1 within the cylinder prevented.

It will now be clear that the extent of the movement of the free end of the trunnion levers 19 to which the piston 1 and weights 16 are connected is directly proportionate with and governed by the extent of the original movement or shifting of the outer end of the floating lever 26, since the inner end of the said floating lever which is connected with the valves will be returned to its original normal position according to the amount of the original displacement by a smaller or greater movement of the said trunnion levers. It is, therefore, seen that the operator by shifting his lever may cause the release or application of the brakes to the drum to exactly the desired extent, the movement of the master lever and the brake weights exactly coinciding.

It will be seen that by the removal of the pins from the links 18 and of the holding bolts 20ª from the bearings 20 that the entire floating lever mechanism may be removed from the engine without disturbing the valve stems or the sliding block 21.

The actuating piston 1 is provided with an extension 36, in the present instance cast to its upper face, to which extension the piston rod 4, by means of threads formed upon the lower end thereof, is secured. The cross head 13 is secured to the piston rod by means of a nut 38 upon the threaded portion of the rod, said nut forcing the cross head up against a shoulder 4ᵃ upon the said rod, while a jam nut 38ᵃ retains the piston 1 in its proper position upon the rod and prevents it from turning upon the threads. As the piston is positioned in Fig. 2, this being the normal, it is clear that the upward movement of the piston is limited by the engagement of the shoulders 36ᵃ of the extension 36 with the under side of the frame guides 12, but by revolving the piston upon the rod which may be done after the nut 38ᵃ is loosened until the shoulders 36ᵃ clear the said guides, it is possible to draw the piston clear of the cylinder into the chamber 5ᵃ. This permits removal of the piston from the cylinder for the purpose of repairs without dismounting the engine from its seat. Also, by removal of the upper head of the cataract cylinder, the piston rod may be unscrewed from the piston 1 entirely, thereby permitting removal of the latter from the casing.

Many other advantages accrue to the construction described. I am able for example to secure much shorter outfit for a given stroke than would otherwise be possible without the one-piece piston rod and the other details of construction. By the use of the means eliminating lost motion in the pins interconnecting the floating lever and the cross head 13, it is possible to secure an accurate coincidence of movement between the actuating piston and the valves or the operating lever, while a greatly reduced piston movement may be obtained by manipulation of the floating lever by locating the pin 24 through the trunnion lever bosses eccentric to the trunnions, and this is obtained with the use of a very few parts. The levers also are symmetrically placed about the center of the engine whereby side pins with their attendant twisting strains and lost motions are avoided. Furthermore with the construction as shown, the connection between the actuating piston and the weights is direct and eliminates the necessity for guides or stuffing boxes. It will also be seen that any oil that may pass by the stuffing boxes of the cataract or gag will be conducted to the open end of the air cylinder, providing effective lubrication of the piston.

The floating lever mechanism is also adapted to power brake engines in which the pressure medium is a liquid instead of air, in which case it is unnecessary to employ the gag or cataract because of the inelasticity of the liquid.

I claim:

1. In an engine, the combination with a piston, of a valve controlling the movement of said piston, a piston rod, a valve rod, and means operatively connecting said rods including a lever connected with the piston rod and having a trunnion journaled in a fixed bearing, a shaft mounted in the trunnion parallel and eccentric to the axis thereof, and a floating lever pivotally mounted on said shaft and connected with the valve rod and having a second pivot outwardly of the shaft.

2. In an engine, the combination with a piston, of a valve controlling the movement of said piston, a piston rod, a valve rod, and means operatively connecting said rods including a pair of levers connected to and extending one on either side of and evenly spaced with respect to the piston rod, each of said levers having a trunnion, fixed aligned bearings for said trunnions, a shaft mounted in and extending between said trunnions, said shaft being parallel but eccentric to the axis of said trunnions, a floating lever journaled on said shaft intermediate the first-named levers and evenly spaced with respect thereto and having a bifurcated end embracing and secured to the valve rod whereby the said levers are symmetrically arranged with respect both to the piston rod and to the valve rod, and a pivot for said lever outwardly of said journal.

3. In an engine, the combination with a piston, of a valve controlling the movement of said piston, a piston rod, a valve rod, and means operatively connecting said rods including a pair of levers connected to and extending one on either side of the piston rod, said levers being pivotally mounted on aligned axes, and a floating lever pivotally mounted upon and intermediate said first-named levers on an axis paralleling but eccentric to the axis of the latter and being connected with the valve rod, said floating lever extending at an angle to but in a plane with the valve rod whereby the levers are symmetrically arranged with respect both to the piston rod and the valve rod, a spring operating on the valve rod and tending to move the valve to a predetermined position, and means releasably connected with said floating lever and normally counteracting the spring pressure.

4. In an engine, the combination with a piston, of a valve controlling the movement of said piston, a piston rod, a valve rod, and means operatively connecting said rods including a pair of levers connected to and extending one on either side of and evenly spaced with respect to the piston rod, each of said levers having a trunnion, fixed aligned bearings for said trunnions, a shaft mounted in and extending between said trunnions, said shaft being parallel but eccentric to the axis of said trunnions, and a floating lever journaled on said shaft intermediate the first-named levers and evenly spaced with respect thereto and having a bifurcated end embracing and secured to the valve rod whereby the said levers are symmetrically arranged with respect both to the piston rod and to the valve rod, a spring operating on the valve rod and tending to move the valve to a predetermined position, and means releasably connected with said floating lever and normally counteracting the spring pressure.

ROSCOE MOORE.